Jan. 13, 1931.   J. W. BEARD   1,788,505
HOSE CLAMP
Filed April 22, 1929   2 Sheets-Sheet 1
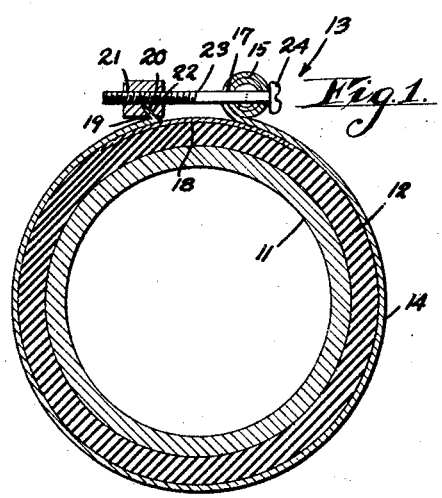
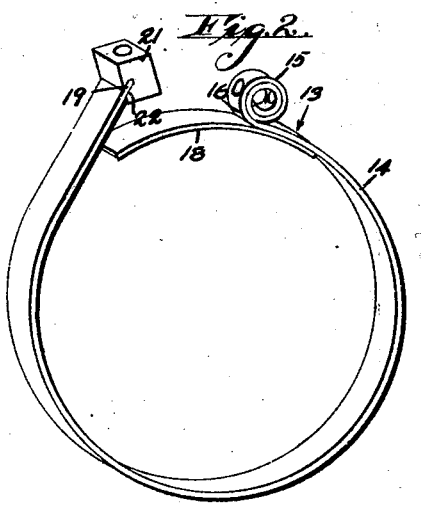
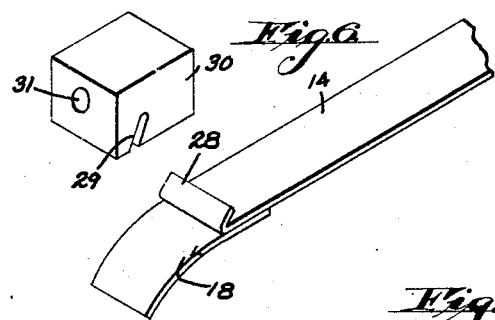
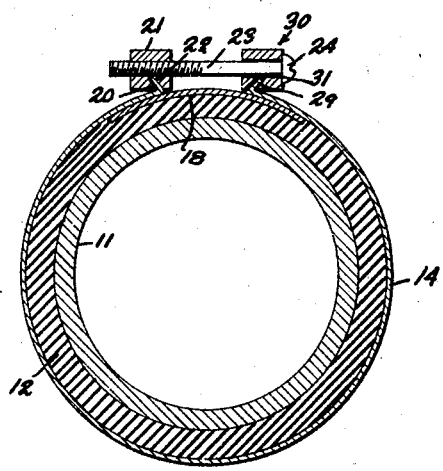
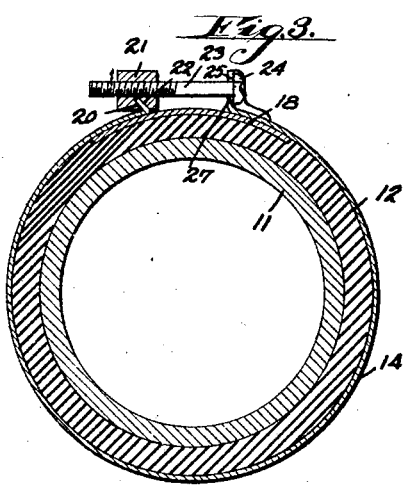
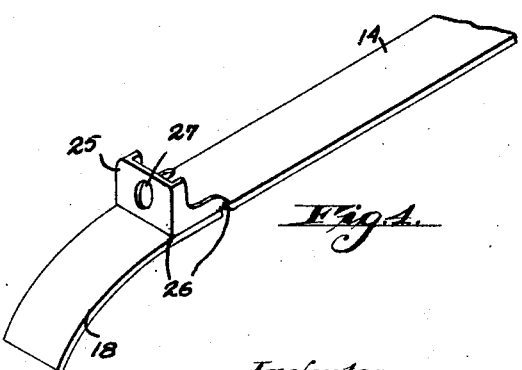
Inventor
James W. Beard
by Hazard and Miller
Attorneys Jan. 13, 1931.　　　J. W. BEARD　　　1,788,505
HOSE CLAMP
Filed April 22, 1929　　　2 Sheets-Sheet 2
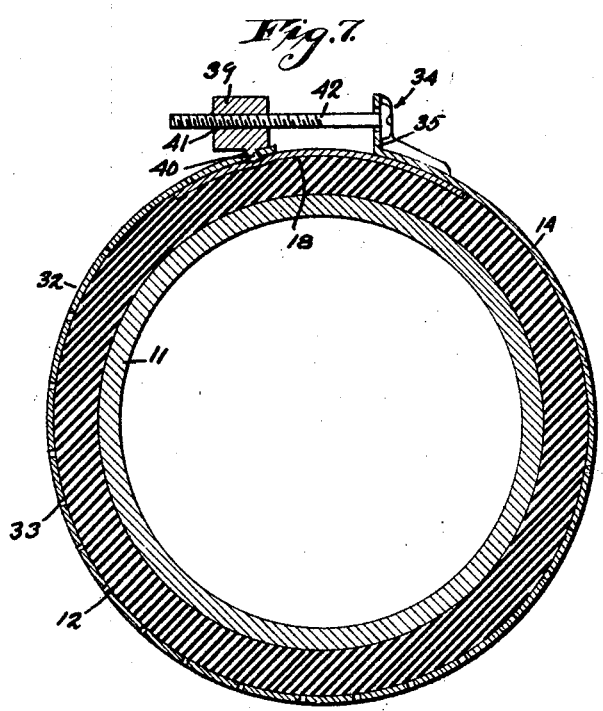
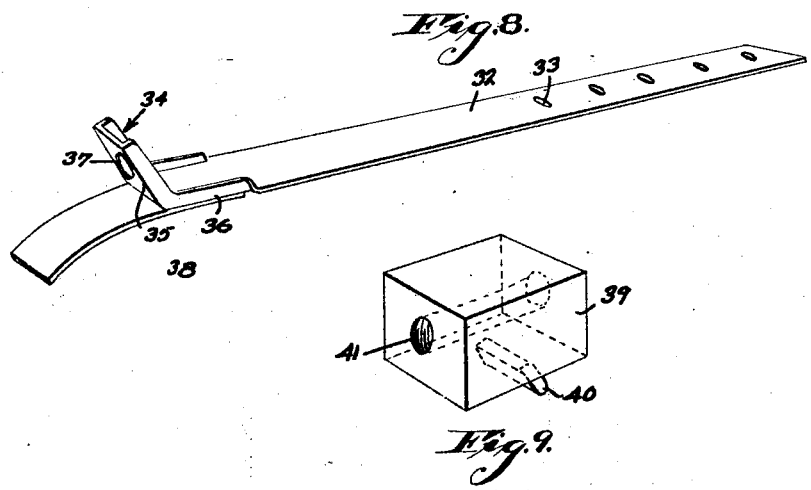
Inventor
James W. Beard
by Hazard and Miller
Attorneys Patented Jan. 13, 1931

1,788,505

UNITED STATES PATENT OFFICE

JAMES W. BEARD, OF SANTA MONICA, CALIFORNIA

HOSE CLAMP

Application filed April 22, 1929. Serial No. 357,229.

My invention is a hose clamp or similar structure adapted to clamp tubular articles to another article.

An object of my invention is a clamp adapted for purposes of a hose clamp in which a clamping band or strap is made of comparatively light material having the desired tensile strength and of such character that it may be readily bent around a cylindrical article such as the end of a hose which it is desired to clamp to a ferrule or to a coupling.

In conjunction with this strap I utilize a special nut having a notch or groove on one side which may be fitted in the free end of the clamping strap and bend this in reference to the main portion of the strap. Or if desired the end of the strap may be bent by any suitable tool and this bent end fitted in the groove in the side of the nut. A bolt is passed through a lug secured to a part of the strap and is threaded on the nut, thus joining the two portions of the strap tightly together encircling a hose or other article.

Another object of my invention is a clamp having a relatively thin flexible strap which may be bent around a hose or the like and such strap may be cut to the proper length by the person applying the clamp. Thus a fitting having a strap may do for a large number of sizes of hose in which the end may be gripped and bent in the manner set to engage the slit or groove in the nut.

A further detailed object of my invention is forming the lug on the strap by making a coil of one end of the strap and having a perforation through the coil for the insertion of a bolt. I also preferably have a tongue extending from the portion of the strap having the lug and fitting underneath the the free end to which the nut is secured.

Another object of my invention is forming a hose clamp in which both ends may have an angularly bent end tip both of which may be secured in slots or grooves in a nut and a complementary abutment plate block. This abutment block has a perforation therethrough through which the bolt passes.

My invention is illustrated in the accompanying drawings in which,

Figure 1 is a sectional through a hose applied to a ferrule or coupling or the like and showing my clamp partly in section;

Figure 2 is a perspective view of the strap and associated parts before bending around a hose, indicating the manner of bending the tip end;

Fig. 3 is a view similar to Fig. 1, showing a different type of lug mounted on the strap;

Fig. 4 is a perspective view showing the lug of Fig. 3 and part of the strap;

Fig. 5 is a view similar to Fig. 1, showing an alternative form, in which the strap has a pair of angularly bent end portions engaging a nut and a removable abutment block;

Fig. 6 is a perspective view of a portion of the strap of Fig. 5 and an abutment block.

Fig. 7 is a cross-sectional view of an alternative form of hose clamp;

Figs. 8 and 9 are perspective views of the strap and nut used in Fig. 7.

In the drawings a ferrule or a cylindrical part of a hose coupling is indicated by the numeral 11, the hose 12 being fitted thereover. This hose is held in place by a clamp designated generally by the numeral 13. This clamp embodies a strap 14 preferably of thin flexible metal and has a lug 15 at one end. This lug is formed in one case by coiling the metal at the end of the strap as indicated at 16 (Figs. 1 and 2) and drilling a perforation 17 through the coil forming the lug. There is a tongue 18 secured to the strap and having the lug preferably welded thereto. The free end 19 of the strap may be made of sufficient length to pass around the standard size hose or may be left in different lengths so that the person applying the clamp may cut the end to suit his requirements. The tip of the free end is given an angular bend as indicated at 20 (Fig. 1).

A nut 21 has an angular slot or groove 22 extending inwardly from one of its faces, this being to accommodate the bent tip end 20 of the strap. A bolt 23 is passed through the perforation in the lug 15. This bolt has a head 24 preferably with a screw driver kerf so that the bolt may be tightened in the nut and in such tightening action the nut draws on the bent tip end 20 and thus tightens the whole strap around the hose. If desired the nut may be utilized to bend the tip end, however, this may be done by pliers or other tools.

In Figs. 3 and 4 I illustrate an angular lug 25 which may be riveted or welded to the end 26 of the strap, the tongue 18 being welded on the inner side. This lug also has a perforation 27 through which the bolt may be passed as indicated in the construction of Fig. 3.

In the construction of Figs. 5 and 6 the end of the strap having the tongue is provided with a bent tip end 28 which engages in the slot or groove 29 of an abutment block 30, this block having a perforation 31. The opposite end of the strap has its tip end bent in the manner shown in Figs. 1, 2 and 3. In this construction the abutment block is fitted on one of the bent tip ends and the nut on the other end. These are drawn together by tightening the screw bolt, the head of which bears against the abutment block and the other end being screwed through the nut. This structure dispenses with forming the coiled lug as shown in Figs. 1 and 2 or a welded lug as shown in Figs. 3 and 4.

In the construction of Fig. 7 the strap 32 is illustrated as having a series of slots 33 and at one end there is a lug 34. This lug is preferably made by bending an end 35 upwardly and bending the sides of the strap inwardly, forming flanges 36. This forms a side flange and a flange along the bent end 35. A perforation 37 is provided for the bolt. A tongue 38 is secured to the end of the strap having the lug by welding or the like. With this perforated strap I use a nut 39 having a tongue 40 extending from one side. The nut is provided with a screw threaded aperture 41 so that when the bolt 42 fitted through the perforation 37 of the lug is threaded through the nut and the tongue engages the slots 33, the strap may be pulled tightly around a hose or the like. The strap may be cut in any suitable length to fit different size hose. Therefore a simple manner of manufacturing both types of straps is to make these sufficient long to cover several sizes of hose; then the person applying the strap may cut the same to the desired length.

The lug shown in the construction of Figs. 3 and 4 may also be made in the same manner as the lug shown in Figs. 7 and 8, it being usually preferable to form the lug of the material of the strap rather than to weld a lug on the end of the strap.

Concerning my construction in which the slotted nut is utilized, it will be seen that a characteristic feature is that the bent portion of the band extends outwardly and fits in the slot, that is the terminal portion of the band extends into the slot of the nut.

Various changes may be made in the principles of my invention without departing from the spirit thereof as set forth in the description, drawings and claims.

I claim:

1. A hose clamp comprising in combination a strap adapted to encircle a hose, a nut having a slot to form a disconnectible engagement with one end of the strap, a bolt threaded in the nut, means forming a connection between the bolt and another part of the strap, whereby on tightening the bolt the strap is tensioned around the said hose the terminal portion of the strap fitting in the slot.

2. A hose clamp comprising in combination a strap adapted to encircle a hose, a nut having a slot at an angle to its axis and adapted to engage a bent end of the strap, a bolt threaded in the nut and a connection between the bolt and another part of the strap, adapted on tightening of the bolt to tighten the strap around the hose the terminal portion of the strap fitting in the slot.

3. A hose clamp comprising in combination a flexible metal strap adapted to bend around a hose, a nut having a slot or groove extending inwardly from one side at an angle to the axis of the nut, said slot being adapted to bend one end of the strap and to retain such end therein, a bolt threaded in the nut, a connection between the bolt and another part of the strap, whereby on tightening the bolt a clamping action is exerted by the strap on the bolt.

4. A hose clamp comprising in combination a strap adapted to encircle a hose, a nut having a slot on one side adapted to disconnectibly engage an outwardly bent end of the strap at the terminal portion, a lug secured to another portion of the strap, a bolt engaging said lug and threaded in the nut, the tightening of the bolt exerting a tension on the said strap, the terminal portion of the strap fitting in the slot.

5. A hose clamp comprising in combination a flexible strap adapted to encircle a hose, a nut having a slot in one side, adapted to engage an outwardly bent end of the strap at the terminal portion, a lug secured to another part of the strap, a bolt extending through the said lug and threaded in the nut, and a tongue extending between the said ends of the strap, the tightening of the bolt being adapted to tighten the strap, the terminal portion of the strap fitting in the slot.

6. A hose clamp comprising in combination a metal strap adapted to encircle a hose, a nut having a slot in one side at an angle to its axis, a lug secured to another part of the strap formed with bracing flanges of such strap, said lug having a perforation and a bolt extending through the perforation and threaded into the nut, the tightening of the bolt being adapted to tighten the said strap.

7. A hose clamp as claimed in claim 6, the end of the strap with the lug having a tongue attached thereto, the tongue extending under the other end of the strap.

8. A hose clamp comprising in combination a metal strap adapted to encircle a hose, a nut having a slot in one side, a lug secured to another part of the strap, said lug being formed of an angularly bent portion of the strap having a perforation therethrough, the end of the strap having an outwardly bent terminal portion fitting in the said slot, and a bolt extending through the perforation and being threaded into the said nut.

9. A hose clamp, comprising in combination a metal strap adapted to encircle a hose and having an outwardly bent terminal end, a lug secured to another portion of the strap, extending outwardly therefrom with a perforation therethrough and with bracing flanges connected to the strap, a tongue extending from the lug, adapted to fit underneath the portion of the strap adjacent the terminal end, a nut having a slot at one side to engage the outwardly bent end of the terminal portion of the strap, and a bolt extending through the perforation and threaded through the nut.

In testimony whereof I have signed my name to this specification.

JAMES W BEARD.